United States Patent
Sharma et al.

(10) Patent No.: US 10,678,590 B1
(45) Date of Patent: Jun. 9, 2020

(54) BATCH PROCESS MONITORING AND ALERTING BASED ON SELECTION OF BUFFER TIMES

(71) Applicant: Capital One Services, LLC, McLean, VA (US)

(72) Inventors: Tanu Sharma, Glen Allen, VA (US); Veronica L. Driscoll, Midlothian, VA (US); Vishesh Sharma, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/700,707

(22) Filed: Dec. 2, 2019

(51) Int. Cl.
*G06F 9/46* (2006.01)
*G06F 9/48* (2006.01)
*G06F 9/54* (2006.01)

(52) U.S. Cl.
CPC ............ *G06F 9/4887* (2013.01); *G06F 9/466* (2013.01); *G06F 9/542* (2013.01); *G06F 9/544* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 7,120,648 B2* | 10/2006 | Garth | G06F 16/20 |
| 7,512,946 B2* | 3/2009 | MacLellan | G05B 19/41865 |
| | | | 708/490 |
| 8,856,807 B1 | 10/2014 | Khapre et al. | |
| 10,083,060 B2 | 9/2018 | Ruggiero et al. | |
| 2003/0149717 A1 | 8/2003 | Heinzman | |
| 2019/0065533 A1 | 2/2019 | Pulaski | |

* cited by examiner

*Primary Examiner* — Bing Zhao
(74) *Attorney, Agent, or Firm* — Sterne, Kessler, Goldstein & Fox P.L.L.C.

(57) ABSTRACT

A system monitors a batch process performed locally or remotely by reading output logs of the batch process during and after execution of the batch process. The system determines a baseline execution duration for the batch process based on previous runs of the batch process on a set of data. Subsequent runs of the batch process are monitored by reading an output log file while the batch process is executing. A buffer time, corresponding to a time range, is added to the baseline execution duration to produce an alert threshold. The system generates alerts and sends the alerts to a messaging system in response to the current execution duration exceeding the alert time.

16 Claims, 6 Drawing Sheets

BATCH PROCESS MONITORING AND ALERTING BASED ON SELECTION OF BUFFER TIMES

BACKGROUND

Batch processes may be executed on data generated on a daily basis. There are many purposes for executing batch processes and the outputs of batch processes may be used for a variety of different reasons. Data on which batch processes are executed may represent financial transactions, consumption of resources, traffic flows, business activities, weather patterns, or any number of real world events or phenomena. Because a batch process may be widely applicable, the design and implementation of batch processes may be performed by third-party service providers that specialize in a particular set of metrics or data processing methods. A batch process executed by a third-party service provider may be a "black box" when it comes to visibility into the internal process or execution of the batch process.

BRIEF SUMMARY

Systems and methods of monitoring batch processes are disclosed herein. According to an embodiment, batch process monitoring comprises determining, by one or more processors, a baseline execution duration corresponding to a batch process comprising a computation executed on a first data set. The method further comprises executing, by the one or more processors, the batch process on a second data set different from the first data set and determining, by the one or more processors, a current execution duration corresponding to the batch process during execution of the batch process on the second data set. The process further comprises generating, by the one or more processors, an alert in response to the current execution duration being greater than the baseline execution duration plus a buffer time.

Batch process monitoring may further comprise executing, by the one or more processors, the batch process on the first data set, and creating a first computer-readable record, comprising data related to execution duration of the computation, in response to executing the batch process on the first data set. The determining of the baseline execution duration comprises reading, by the one or more processors, the first computer-readable record.

The baseline execution duration may be based on an execution duration of the computation of the batch process executed on the first data set. The baseline execution duration may be based on an aggregate of execution durations of multiple batch processes, including the batch process executed on the first data set.

The determining of the current execution duration may comprise reading a second computer-readable record comprising data related to execution duration of the computation corresponding to the batch process executing on the second data set. The current execution duration may be determined based on a start time corresponding to the batch process executing on the second data set. Alerts may be transmitted to a subscriber-based message system.

Batch process monitoring may further comprise displaying a visual representation of the current execution duration and the baseline execution duration.

The buffer time may be determined by selecting, based on the baseline execution duration, from two or more buffer times, wherein each of the two or more buffer times corresponds to a range of time for the baseline execution duration.

A system for monitoring a batch process comprises a batch executor configured to execute a batch process comprising a computation performed on a first data set. In response to executing the batch process on the first data set, the system creates a first computer-readable record comprising data related to an execution duration of the computation. The system executes the batch process on a second data set and creates, during execution of the batch process on the second data set, a second computer-readable record comprising data related to an execution duration of the computation corresponding to the batch process executing on the second data set. A monitoring device is configured to determine a baseline execution duration based on the first computer-readable record and determine, during execution of the batch process on the second data set, a current execution duration based on the second computer-readable record. The system generates an alert in response to the current execution duration being greater than the baseline execution duration plus a buffer time.

The system may further comprise an alert service configured to transmit the generated alert to one or more channels of a subscriber-based messaging system. The system may further comprise a storage, and the batch monitor is further configured to store the generated alert in the storage. The alert service may be configured to read the alert from the storage and transmit the alert to a subscriber.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A batch process may be run on a daily basis on a new set of data generated each day. The batch process comprises one or more tasks, and tasks comprise one or more computations performed on data input to the batch process. Tasks may be identified with a task identifier. The one or more computations may produce a result that provides insight into general properties of the data on which the batch process was executed. Batch processes may be executed on very large sets of data using a computer. In one example, a batch process may execute on daily financial account and transaction data in order to determine daily liquidity coverage ratio or other metrics used to assess regulatory compliance in the banking industry. A batch process may take anywhere from minutes to hours to complete. The execution duration for a batch process and tasks in a batch process may vary as the batch process is executed on different data sets. The execution duration for a batch process may also vary as a result of new logic introduced into the batch process or as a result of hardware-related issues, such as demand fluctuations, power interruptions, malfunctions, or changes in the hardware executing the batch process.

An entity running the batch process is not always the same as the entity that implemented the computer code for executing the batch process. Therefore, a batch process, and possibly the system executing the batch process may be viewed as a "black box", and visibility into the batch process is often limited. In many instances, the only insight into the batch process comes from access to inputs to and outputs from the batch process. Inputs to the batch process may be in the form of data on which the batch process operates and commands to begin or manage the progress of the batch process. Outputs may be results of the batch process and/or log events produced by the batch process which may be written to a log file or a table of the database.

A batch process may be unintelligent; it may not be capable of detecting errors in the data or computations performed on the data. Although the database system running the batch process may generate outputs related to the execution and completion of batch processes, the database system may be incapable of generating a notification that a batch process or task has failed. The batch process may also hang, or fail to execute properly on the input data, without producing any distinct indication of an abnormality. Currently, these types of processes are monitored manually by observing information displayed on a screen. Because the batch process may take hours to execute, if the process hangs, it may be hours before an administrator recognizes the existence of an issue requiring attention.

Monitoring "black box" batch processes presents a challenge because access and visibility into the individual computations performed during the batch process is not readily available. The embodiments discussed herein describe a system and method for monitoring batch processes to detect abnormalities and alert administrators so that appropriate action can be taken.

Figure 1:
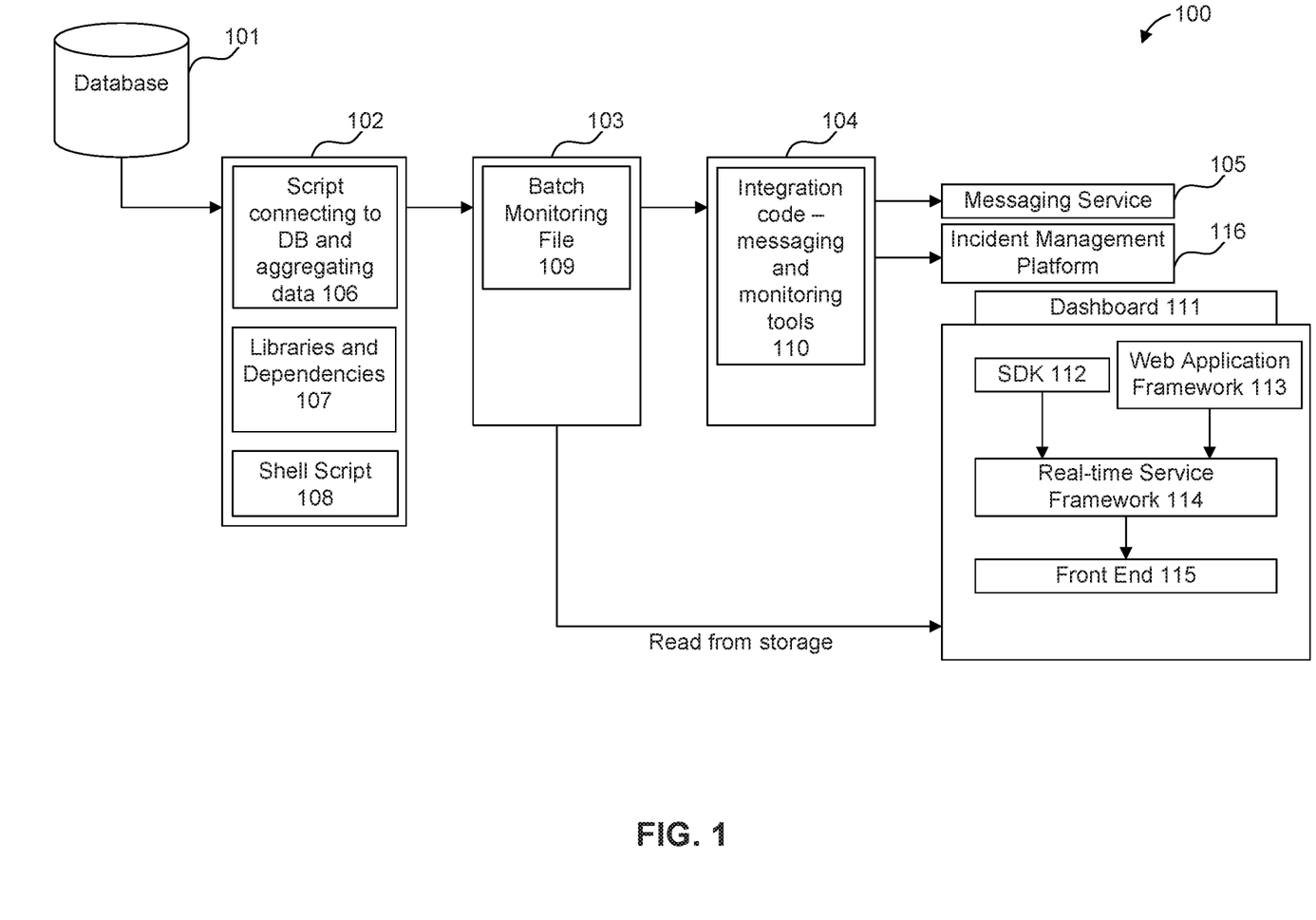
FIG. 1 is a data flow diagram illustrating processes and data outputs according to an embodiment.

According to an embodiment illustrated in FIG. 1, the batch process monitoring system 100 comprises a batch executor (database 101 in FIG. 1), a batch monitor 102, storage 103, an alert service 104, and a messaging service 105. The batch executor may be a database 101 configured to execute one or more batch processes on data in the database according to a schedule.

According to an embodiment illustrated in FIG. 1, an aggregation script 106 running on a batch monitor 102 connects to the database 101 and aggregates information related to batch process execution from the database. The database may be configured to write data related to batch process execution to a custom batch information table. The data related to batch process execution may include data related to the start time, progress, duration, and success or failure of one or more tasks of the batch process currently executing and/or previously executed by the database 101. The batch information table may be used as an interface point between a batch process monitoring system 100 and the database 101 system, enabling programmatic access that is not native to the database 101 system.

According to an embodiment the aggregation script 106 may make use of libraries 107 and may include dependencies on other support code. A shell script 108 may be used to configure the computing environment and call the aggregation script 106 according to a periodic schedule.

According to an embodiment, the aggregation script 106 is configured to process the data from the batch information table and to record aggregated batch data in a batch monitoring file 109. The aggregated batch data stored in the batch monitoring file 109 comprises information related to batch process execution and may include execution duration, execution start time, execution status (on-going, success, fail), execution end time, task ID, historical execution durations, a baseline execution duration based on historical execution durations, one or more alert flags, or any other data related to execution of the batch process. According to an embodiment, the aggregation script 106 is configured to store the baseline execution duration, one or more historical execution durations, current execution duration, and an alert flag in the batch monitoring file 109.

According to an embodiment, the aggregation script 106 uniquely identifies tasks in a batch process using a task identifier based on a task number and a task description. The task number may represent the sequence corresponding to the task in the batch process. The task description may be a text description of the computations performed during execution of the task.

According to an embodiment, the system determines a baseline execution duration as the median execution duration from the past ten days of batch process executions. For a task where the execution duration is fairly consistent, but may occasionally hang, or take considerably longer than usual, using the median to determine the baseline execution duration provides a reasonable prediction of how long the batch process should take to execute successfully while avoiding skewing that might result from extremely high or low execution durations when using an average. Although ten days of batch execution data are used for determining a baseline execution duration in an embodiment disclosed herein, more days or fewer days may be used.

According to an embodiment, the aggregation script 106 monitors a currently running batch process, compares the current execution duration to the baseline execution duration, and sets an alert flag in the batch monitoring file in response to the current execution duration exceeding the baseline execution duration plus a buffer time. The batch monitoring file may be stored in storage 103 that is accessible to both the batch monitor 102 and the integration code 110. Setting an alert flag in the batch monitoring file 109 triggers execution of integration code 110.

According to an embodiment, the storage 103 is configured to trigger execution of the integration code 110 in response to the setting of the alert flag in the batch monitoring file 109. The integration code 110 may be configured to read the batch monitoring file and generate an alert corresponding to any alert flags that have been set in the batch monitoring file. According to an embodiment, the alert service 104 is configured to execute the integration code 110 and post alerts to the messaging service 105. The messaging service 105 may be configured to forward alerts to end users and administrators of the database and/or batch process, who can then respond appropriately and in a timely manner. According to an embodiment, the messaging service 105 is subscriber based messaging service.

According to an embodiment, the aggregation script 106 determines an appropriate buffer time based on a definition of two or more buffer times that each correspond to a time range of the baseline execution duration. For example, for a baseline execution duration between 0 and 3 minutes, the buffer time may be set to 6 minutes; for a baseline execution duration between 3 and 5 minutes, the buffer time may be set to 7 minutes; and for a baseline execution duration between 7 and 10 minutes, the buffer time may be set to 15 minutes, and so forth. Any number of time ranges may be used, each corresponding to a buffer time, and a person of ordinary skill in the art would be capable of adding longer or shorter time ranges with appropriate buffer times for a variety of different baseline execution durations. In this manner, the buffer time added to a task or a batch process is self-rectifying when the execution duration changes.

According to an embodiment, the batch process monitoring system 100 further comprises a dashboard 111. The dashboard 111 may comprise a front end 115 which reads data from the batch monitoring file 109 directly from the storage 103 through a real time service framework 114. The front end 115 may be configured to displays real time progress and monitoring information to the dashboard 111 of the batch process monitoring system 100. According to an embodiment, the dashboard 111 is configured to read the batch monitoring file 109 from the storage 103 so that the dashboard 111 is capable of running independent from and in parallel with the messaging service 105.

FIG. 1 illustrates an embodiment for explanation purposes only, and the various disclosed embodiments are not limited to the description provided in reference to FIG. 1. The database 101 may be any database that runs periodic batch processes on data in the database 101. Batch processes may be performed daily, weekly, monthly, annually, or according to any other schedule as needed. The database 101 may be configured to write data related to batch execution to a batch information table of the database or to a log file. According to an embodiment, the database 101 comprises a database and an analytical application for executing batch processes. The database 101 may be configured to output data related to execution of batch processes to a batch information table. The aggregation script 106 may be configured to access the database through a plugin and query the batch information table using Structured Query Language (SQL) or any other language or communications protocol for accessing data in the database.

The batch information table may be any computer-readable record, including a database, a table, or a data file and may comprise historical data related to past executions of one or more batch processes and/or current data related to a currently executing batch process.

Tasks may be added to or removed from a batch process. The aggregation script 106 may create a unique task identifier for each task based on a batch identifier and/or a batch number in combination with the task number and/or the task description. The task number may indicate the sequence in which tasks are executed in the batch process. The order in which tasks are executed in a batch process may change. When the aggregation script 106 detects a new task, based on the unique identifier, the aggregation script 106 begins tracking historical execution duration for that new task. Once at least one execution of the task has been completed, a baseline execution duration can be determined based on the completed execution. As the new task is executed more times, historical execution durations are accumulated, and the aggregation script 106 may determine the baseline execution duration based on the historical execution durations.

The baseline execution duration for a task of the batch process represents an expected execution duration for the batch process under normal operating conditions and may be based on one or more past batch process executions. In determining the baseline execution duration, the script may determine the average, median, maximum, and/or minimum execution duration for one or more tasks in the batch process, or for the batch process as a whole. According to an embodiment, the system is configured to update the baseline execution duration on a regular basis, such as daily, based on execution durations from the most recent batch process executions.

The aggregation script 106 may be configured to generate aggregated batch data comprising one or more of batch start time, batch progress, alert flags, historical data of execution durations for the batch process, the baseline execution duration and/or current execution duration for a currently executing batch process. The aggregated batch data may comprise data related to a batch process as a whole and/or data related to one or more tasks of the batch process. The aggregation script 106 may write the aggregated batch data to the batch monitoring file.

The batch monitoring file need not be a single logical file and may comprise any number of computer-readable records stored at the same or different logical or physical storage locations. The batch monitoring file may comprise a flat file, such as comma separated values (CSV) or Excel spreadsheet (XLS) format.

The batch monitor 102 may comprise: a local on-premises computing system, including a local area network; a machine that also hosts the database 101; or a cloud computing environment providing elastic computing services or container-based computing services. The batch monitor 102 may also host libraries and dependencies 107 for the aggregation script 106. The shell script 108 may also run on the batch monitor 102.

One or ordinary skill in the art would recognize that the integration code 110, in addition to or instead of the aggregation script 106, may also be configured to read the batch monitoring file 109 and generate the alert when the current execution duration exceeds the baseline execution duration plus the buffer time. The integration code 110 may also send formatted alerts to an incident management platform 116, or operations management platform configured to manage, and resolve information technology incidents. Incident management platforms and operations management platforms are well known in the industry and many third-party solutions are readily available.

The storage 103 may be configured to trigger execution of the integration code 110 in response to one or more changes or updates to the batch monitoring file. Execution of the integration code 110 may also be triggered by saving a new batch monitoring file 109 or modifying the batch monitoring file stored in the storage 103.

The storage 103 may comprise a storage service, web-based storage, networked storage, and/or local storage. The alert service 104 may be implemented using on premises computer hardware, on the same monitoring device as the batch monitor 102, the database 101, or the aggregation script 106, on a separate computer with network access to the batch monitor 102, or on a cloud computing service. Cloud computing services are well known in the information technology industry and many third-party cloud computing platforms are readily available. According to an embodiment, the alert service 104 is implemented on a cloud computing service providing Functions as a Service (FaaS).

The messaging service 105 may be a push notification service, an email messaging service, or a custom built messaging service, a subscriber based messaging service, or another third-party messaging service. According to an embodiment, the messaging service 105 comprises an artificial intelligence platform configured to receive alert messages and generate a voice alert describing the type of alert and/or task corresponding to the alert. Subscriber based messaging services and artificial intelligence platforms are well known in the information technology industry and third-party solutions allowing integration with other computing services, including cloud computing services, re readily available.

According to an embodiment, the system may be configured so that the database 101, the batch process, the monitoring device 102, the aggregation script 106, the storage 103, the alert service 104, the integration code 110, the messaging service 105, the incident management platform 116, and the dashboard 111 are all run on separate computer systems connected in a networked computing environment. According to another embodiment, the system may be configured so that the database 101, the batch process, the monitoring device 102, the aggregation script 106, the storage 103, the alert service 104, the integration code 110, the messaging service 105, the incident management platform 116, and the dashboard 111 are all run on the same computer system comprising a processor, memory, and storage device. According to another embodiment, the system may be configured so that the database 101, the batch process, the monitoring device 102, the aggregation script 106, the storage 103, the alert service 104, the integration code 110, the messaging service 105, the incident management platform 116, and the dashboard 111 are run on one or more virtual machines in a virtualized computing environment. According to another embodiment, the system may be configured so that the database 101, the batch process, the monitoring device 102, the aggregation script 106, the storage 103, the alert service 104, the integration code 110, the messaging service 105, the incident management platform 116, and the dashboard 111 are run on services in a cloud computing environment. One or more of any of the database 101, the batch process, the monitoring device 102, the aggregation script 106, the storage 103, the alert service 104, the integration code 110, the messaging service 105, the incident management platform 116, and the dashboard 111 may run on the same physical or virtual hardware as any of the other components of the system or different physical or virtual hardware from any of the other components of the system.

Figure 2:
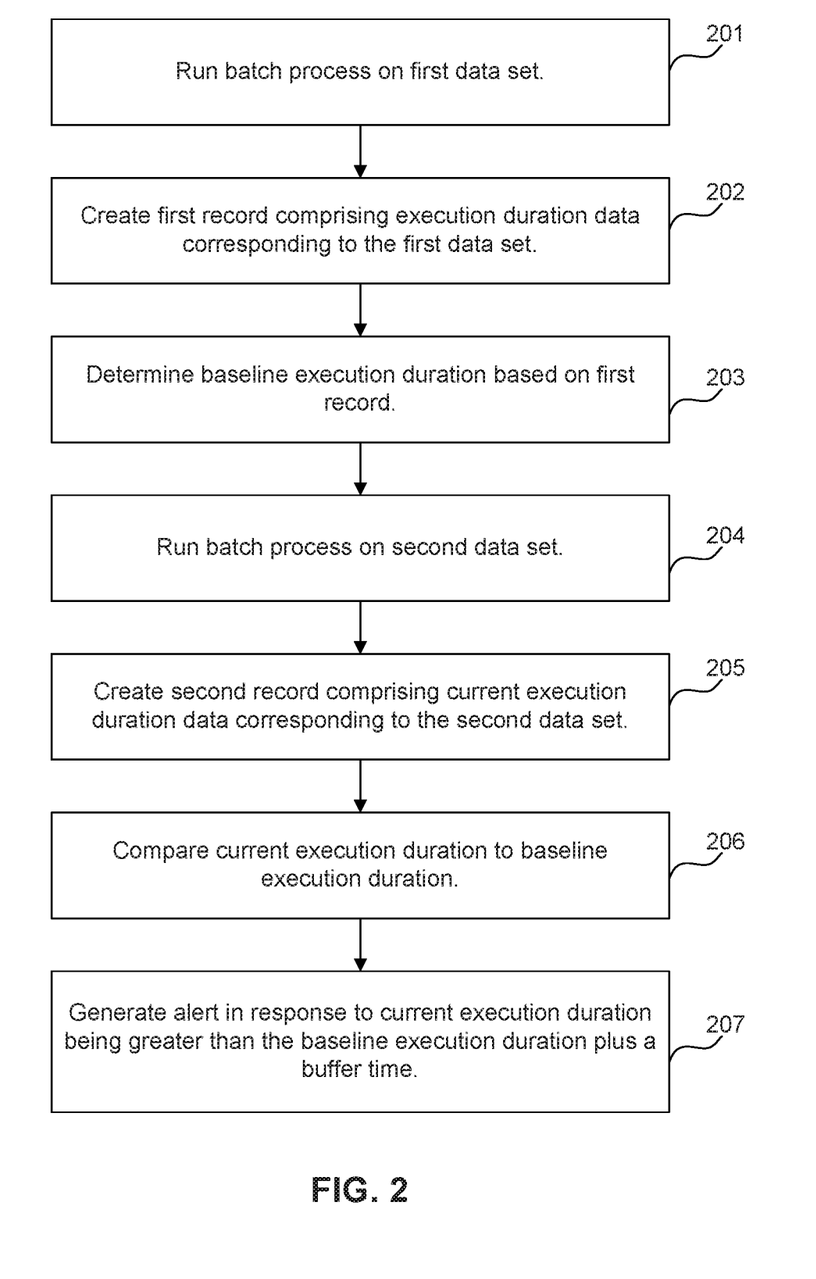
FIG. 2 is a flowchart illustrating monitoring and alerting steps according to an embodiment.

FIG. 2 illustrates steps of a batch monitoring process according to an embodiment. At step 201, the system runs a batch process on a first data set. According to one embodiment, the first data set comprises financial account and transaction data corresponding to a first time period, typically a day, and the batch process comprises an analytical application for determining daily liquidity coverage ratio.

At step 202 the system creates a first record comprising execution duration corresponding to executing the batch process on the first data set. According to an embodiment, the first record may be a batch information table or a log file created by the database. At step 203, the system determines a baseline execution duration based on the first record. According to an embodiment, the system accumulates historical aggregated batch data in the first record and determines the baseline execution duration from a median execution duration of the batch process executed on data sets from the previous 10 days.

At step 204, the system executes the same batch process on a second data set. According to an embodiment, the batch process executed on the second data set comprises a batch process for determining daily liquidity coverage ratio and the second data set comprises financial account and transaction data from a second time period. At step 205, the system creates a second record comprising execution duration data corresponding the batch process currently executing on the second data set. The second record may comprise one or more timestamps corresponding to the batch process and/or a specific task of the batch process. For example the second record may comprise a timestamp corresponding to a start time of the batch process and/or one or more timestamps corresponding to one or more start times of one or more tasks of the batch process.

At step 206, the system compares the current execution duration to the baseline execution duration plus a buffer time. At step 207, the system generates an alert in response to the current execution duration being greater than the baseline execution duration plus a buffer time. According to an embodiment, the buffer time may be determined using a decision mechanism such as a case statement. Each case in the case statement corresponds to a time range of the baseline execution duration and to a buffer time. The time range that the baseline execution duration falls into determines the buffer time applied in generating an alert. Alternatively, a lookup table of baseline execution durations and corresponding buffer times may be used to determine the buffer time.

The system may distribute the alert to end users, such as database administrators and downstream users who rely on the results of the batch process, through the messaging service 105. The system may also be configured to format the alert for integration with an incident management platform. The system may be configured to interact with a variety of messaging and operations management tools.

In general, the steps described with reference to FIG. 2 may be performed by either the aggregation script or the integration code. According to an embodiment, the aggregation script and integration code are merged into a single set of computer-readable instructions running on a single physical or virtual device. According to another embodiment, the system comprises two or more devices (e.g., batch monitor, or alert service), each configured to cooperatively perform one or more of the steps illustrated in FIG. 2 on a single computer system, in a networked computing environment, or a cloud computing environment.

According to an embodiment, the aggregation script 106 is configured to set an alert flag, corresponding to the batch process or corresponding to a task of the batch process, in the batch monitoring file 109. The integration code may be configured to respond to the alert flag in the batch monitoring file by generating an alert and sending the alert to the messaging service 105. According to an embodiment, the integration code is hosted on an Amazon Lambda serverless service that connects to an Amazon S3 bucket where the batch monitoring file is stored. The integration code may be configured to read the alert flag and generate an alert message to be sent to the messaging service, such as Slack or Alexa. The batch process monitoring system 100 may be configured to generate and send alert messages using multiple different messaging services. According to an embodiment, the integration code reads other key variable values from batch monitoring file and provides this output to the message service. These key variables may help the end user in determining the urgency of the alert and how to respond to the alert.

According to an embodiment, alerts may be received on a mobile device, a PC, or any other terminal with authorized access to the messaging service. According to an embodiment, the system may be configured to generate an alert for one or more of a start notification, an end notification, a failure notification, a success notification, or a notification of an execution duration exceeding a threshold. The threshold may be the baseline execution duration plus the buffer time. The system may also be configured to include, in the alert, metadata related to the alert.

According to another embodiment, the integration code performs the comparison between the current execution duration and the baseline execution duration plus buffer time. The integration code may determine an appropriate buffer time based on the baseline execution duration, and generate the alert in response to the current execution duration exceeding the baseline execution duration plus the buffer time.

According to an embodiment, the alert comprises key variable values related to the batch process for the end user to view. Key variables may include the task identifier, a batch process identifier, task start time, batch start time, task description, batch description, task status, batch status, the baseline execution duration, historical execution durations, statistical measures of the execution duration such as minimum, maximum, median, or average, and/or any variables that provide insight to the end user into why the execution duration might change.

According to an embodiment, the system records aggregated batch data in a batch monitoring file containing rows and columns of information related to one or more batch processes and/or one or more tasks of the batch processes. The batch monitoring file comprises one or more of: a baseline execution duration, a buffer time, a sum of the baseline execution duration and the buffer time, a start time, an end time, task status (eg., ongoing, success, fail), execution date and/or an alert flag.

The batch monitoring system may monitor one or more batch processes, including multiple different batch processes running daily, weekly, monthly or according to any schedule. The batch monitoring system may record data corresponding to a batch process as a whole, and/or corresponding to one or more tasks of the batch process. One or more of the first record and second record may be included as part of the batch monitoring file comprising historical execution data for any number of batch process execution events or any number of days. The batch monitoring file may comprise one or more of: batch identification, task identification, a start time, end time, task status (eg., ongoing, success, fail), and/or execution date. The batch monitoring file may comprise aggregated historical runtimes, a timestamp of the start time, current execution duration, a buffer time, and/or an alert flag per task and/or per batch. The aggregated historical runtimes may comprise the baseline execution duration determined based on the minimum, maximum, median, or average execution duration.

Figure 3:
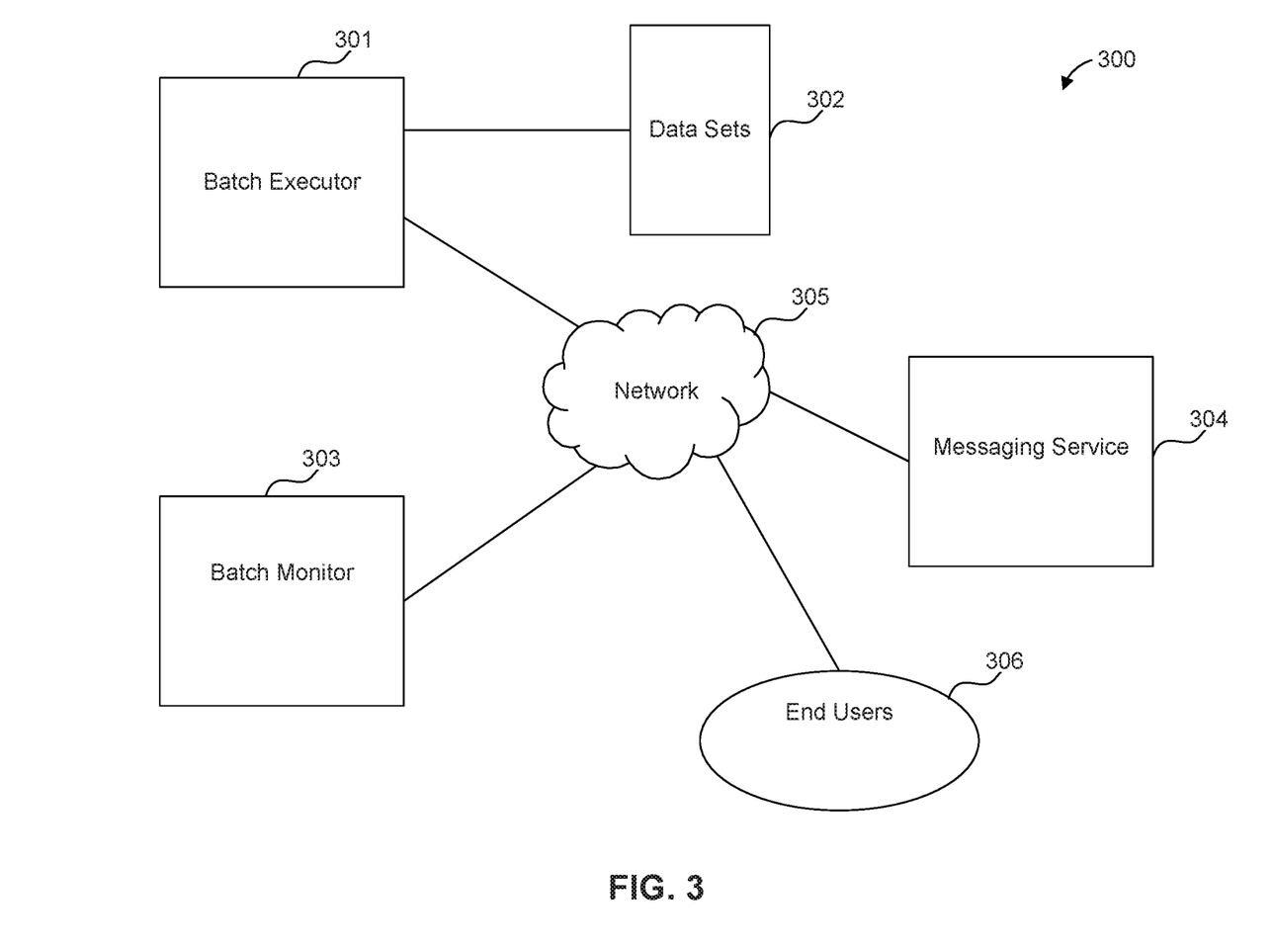
FIG. 3 is a block diagram illustrating a batch monitoring and alerting system in a distributed computing environment according to an embodiment.

Referring now to FIG. 3, according to an embodiment, the batch monitoring system 300 comprises a batch executor 301, which is configured to execute one or more batch processes on data sets 302. The batch executor 301 is configured to retrieve the data sets 302 from a remote location or from local storage.

According to an embodiment, the batch monitoring processor 303 accesses a batch information table of the batch executor 301 through a network 305. The network may be a physical network, local area network, wide area network, or a virtual network in a virtualized computing environment or a cloud computing environment. According to an embodiment, the batch monitoring processor 303 is configured to generate alerts in response to various events, such as beginning execution, progress, success, failure, or execution duration exceeding a threshold, that may occur in relation to one or more tasks of the batch process.

According to an embodiment, the batch monitor 303 is configured to deliver messages to end users 306 via the messaging service 304. The messaging service 304, end users 306, batch monitoring processor 303, and batch executor 301 may run on separate devices and interface with each other through the network 305.

Figure 4:
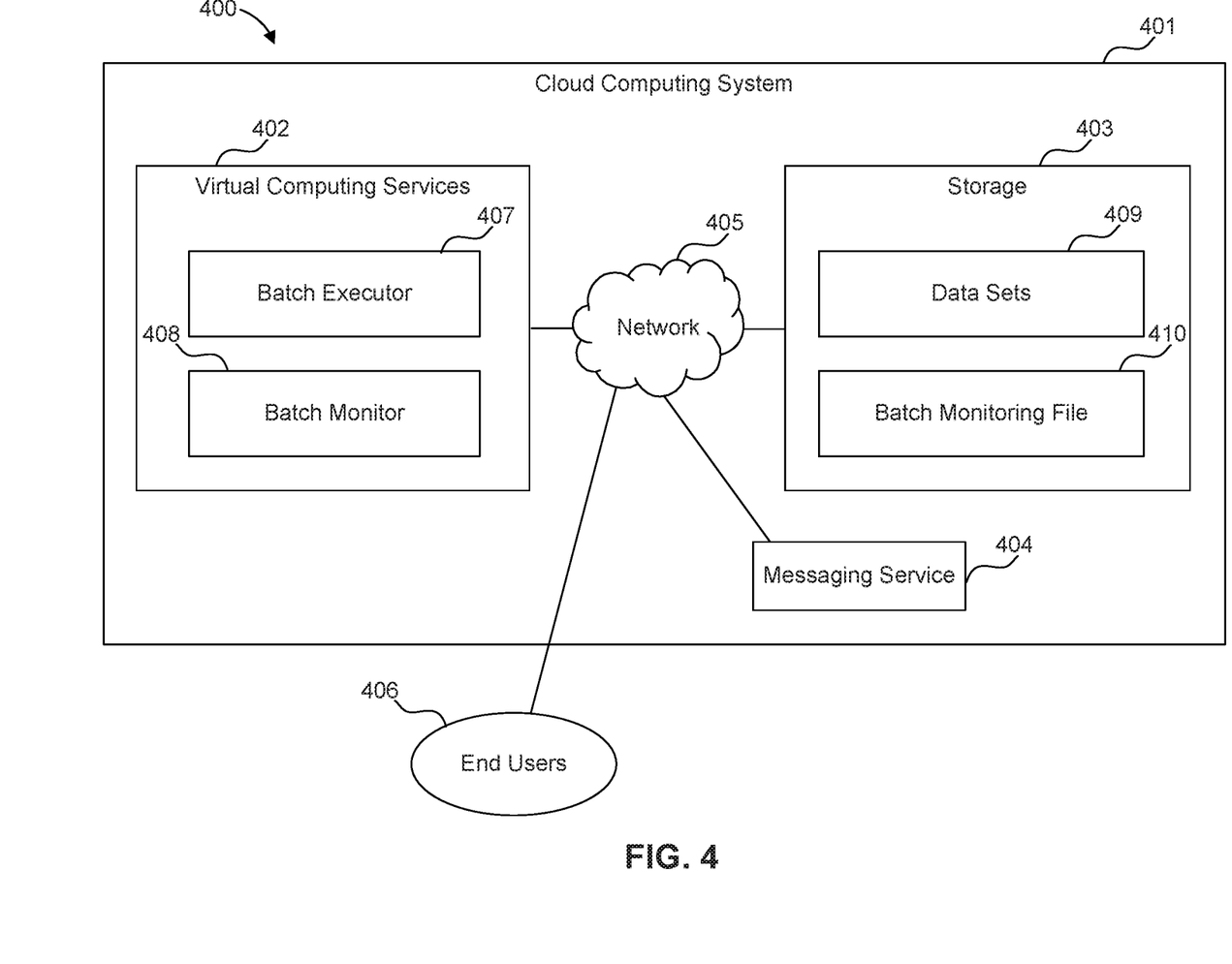
FIG. 4 is a block diagram illustrating a batch monitoring and alerting system in a cloud computing environment according to an embodiment.

According to another embodiment illustrated in FIG. 4, the batch monitoring system 400 may be implemented in a cloud computing system 401. According to an embodiment, the cloud computing system 401 comprises virtual computing services 402 and storage device 403. The batch executor 407 and batch monitor 408 may be hosted by the virtual computing services 402. The data sets 409 and batch monitoring file 410 may be stored in the storage 403. According to an embodiment, end users 406 may interact with the batch monitoring system 400 and receive alerts generated by the batch monitor 408 through a network 405. According to an embodiment, the messaging service, which delivers alerts from the batch monitor 408 to the end users is hosted outside the cloud computing system 401 and interacts with the batch monitor 408 and the end users 406 through the network. According to another embodiment, the messaging service 404 may also be hosted in the cloud computing system 401.

Figure 5:
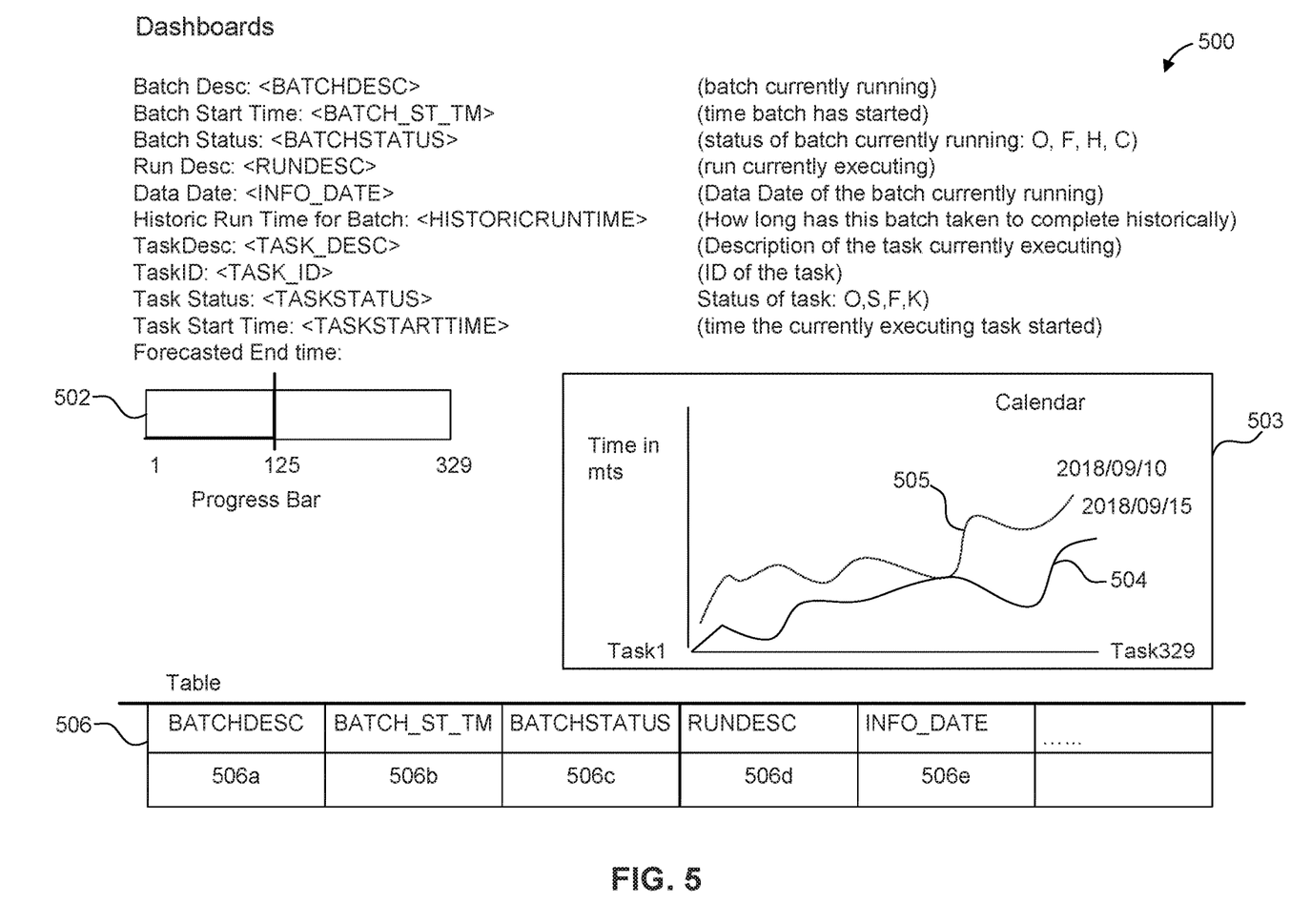
FIG. 5 is an illustration of a graphical user interface for displaying batch process information according to an embodiment.

FIG. 5 is an illustration of a graphical user interface for displaying batch process information according to an embodiment.

According to an embodiment, the dashboard 500 illustrated in FIG. 5 comprises a display of information related to a batch process. The display comprises one or more of: a batch description, a batch start time, batch status, a run description, data date, historic runtime or baseline execution duration for the batch, a task description, task ID, task status, and/or task start time. The batch status may comprise ongoing (O), failed (F), hung (H), or complete (C). The data date may represent the date of the data on which the current batch process is executing. The task status may comprise ongoing (O), Success (S), Failed (F), or killed (K).

According to an embodiment, the dashboard 500 displays a progress bar 502 that indicates the number of tasks complete and the total number of tasks in the batch process. The dashboard 500 may also be configured to display a graph 503 or chart showing the current execution duration 504 overlaid on a graph of a historical execution duration 505. The historical execution duration 505 may be based on an aggregate of previous execution durations, such as the baseline execution duration, or may be the actual execution duration of a representative batch process previously executed.

According to an embodiment, the dashboard comprises a table 506 displaying information related to the currently executing batch process and/or one or more previously executed batch processes. The table 506 may include information related to a previously executed batch process corresponding to the historical execution duration 505 displayed in the graph 503. According to an embodiment, the table 506 comprises a batch description column 506a, a batch start time 506b, a batch status 506c, a run description 506d, a data date 506e, or any information provided in the batch monitoring file, or other historical information for previously executed batch processes that provides broader context for interpreting the information related to the currently executing batch process.

According to an embodiment, the dashboard is configured to display batch information from a batch process executed on a date selected by the user. The user may provide user input selecting which batch process execution duration to display in the graph 503. According to an embodiment, the dashboard is configured to display a forecasted end time for the currently executing batch process. The forecasted end time may be determined based on the baseline execution duration of the entire batch process which may be equal to a sum of baseline execution durations for all tasks in the batch process. As execution of the batch process the forecasted end time may be updated based on the sum of actual execution durations for completed tasks and the sum of baseline execution durations for tasks not yet completed. For the currently executing task, the larger of the baseline execution duration and the actual execution duration may be used in determining the forecasted end time.

According to an embodiment, the dashboard is configured to operate on an end user terminal, including one or more of: a web browser, a mobile device, a smartphone, a tablet, a personal computer, or another type of personal digital assistant. The dashboard is a self-service tool, providing immediate access of batch process execution status and related information to end users.

Figure 6:
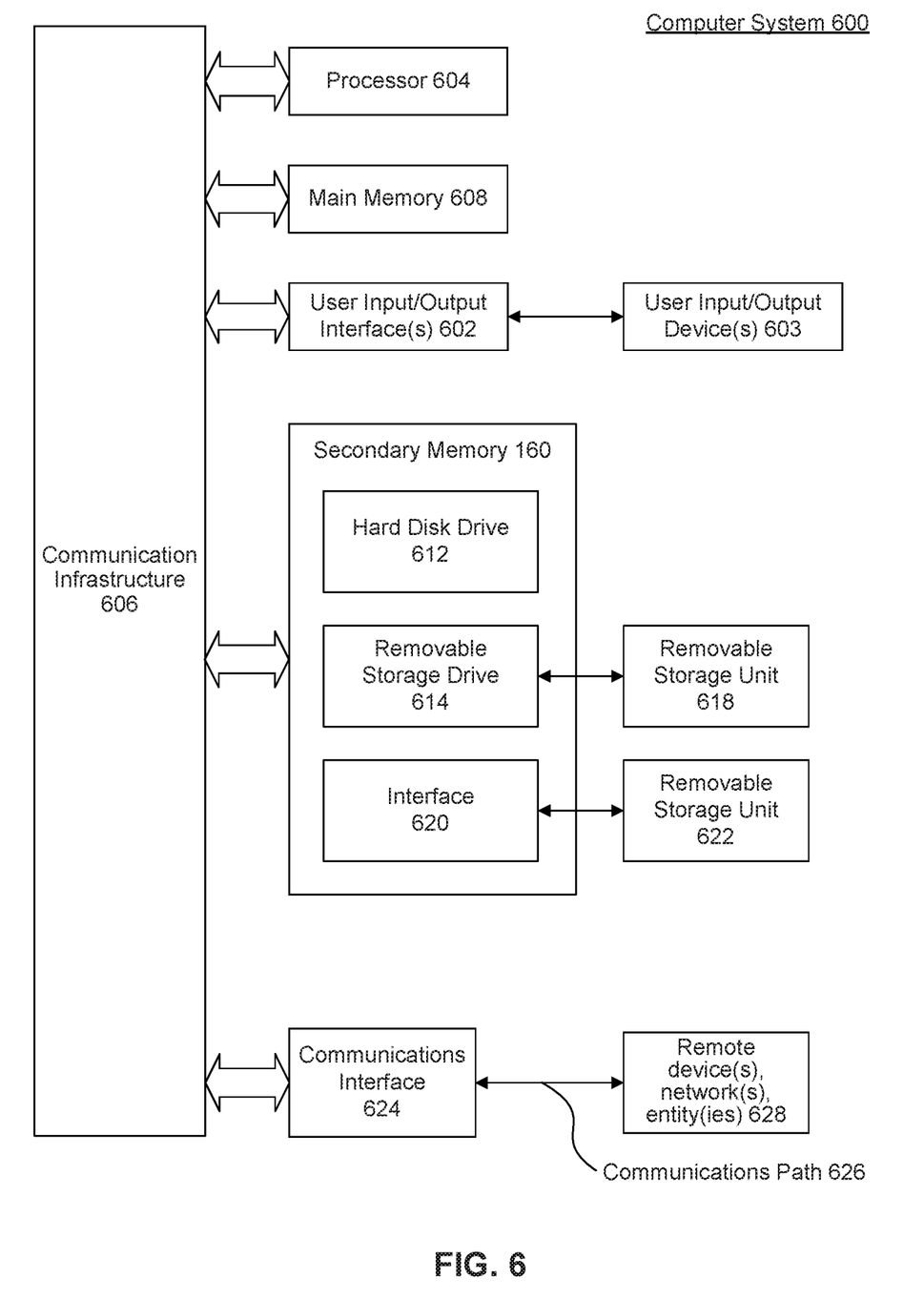
FIG. 6 is a block diagram of a non-limiting example computer system useful for implementing various embodiments disclosed herein.

FIG. 6 is a block diagram of a non-limiting example computer system useful for implementing various embodiments disclosed herein.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of monitoring batch processes, comprising:
   determining, by one or more processors, a baseline execution duration corresponding to a batch process comprising a computation executed on a first data set, wherein the baseline execution duration comprises a time duration based on an execution duration of the computation of the batch process executed on the first data set;
   executing, by the one or more processors, the computation of the batch process on a second data set after executing the batch process on the first data set;
   determining, by the one or more processors, a current execution duration corresponding to the computation of the batch process on the second data set;
   predetermining, by the one or more processors, a plurality of potential buffer times, each of the plurality of potential buffer times associated with an execution time range;
   selecting, by the one or more processors, from the predetermined plurality of potential buffer times a buffer time based on the baseline execution duration being within the execution time range associated with the selected buffer time; and
   generating, by the one or more processors, an alert in response to the current execution duration being greater than a sum of the baseline execution duration plus the buffer time.

2. The method of claim 1 further comprising:
   executing, by the one or more processors, the batch process on the first data set; and
   creating a first computer-readable record, comprising data related to an execution duration of the computation, in response to executing the batch process on the first data set, and wherein the determining of the baseline execution duration comprises reading, by the one or more processors, the first computer-readable record.

3. The method of claim 1, wherein the baseline execution duration is based on an aggregate of execution durations of multiple executions of the batch process, including the execution of the batch process on the first data set.

4. The method of claim 1, wherein the determining of the current execution duration comprises reading a second computer-readable record comprising data related to an execution duration of the computation of the batch process executing on the second data set.

5. The method of claim 4, wherein the current execution duration is determined based on a start time corresponding to the batch process executing on the second data set.

6. The method of claim 1, further comprising transmitting the alert to a messaging service.

7. The method of claim 1, further comprising displaying a visual representation of the current execution duration and the baseline execution duration.

8. A system for monitoring a batch process, the system comprising:
   a batch executor configured to:
      execute a batch process on a first data set, wherein the batch process comprises a computation;
      in response to executing the batch process on the first data set, create a first computer-readable record comprising data related to an execution duration of the computation of the batch process;
      execute the computation of the batch process on a second data set after executing the batch process on the first data set; and
      create, during execution of the batch process on the second data set, a second computer-readable record comprising data related to an execution duration of the computation of the batch process executing on the second data set; and
   a monitoring device, coupled to the batch executor, configured to:
      determine a baseline execution duration based on the first computer-readable record, wherein the baseline execution duration comprises a time duration based on the execution duration of the computation of the batch process executed on the first data set;

determine, during execution of the batch process on the second data set, a current execution duration based on the second computer-readable record;

predetermine a plurality of potential buffer times, each of the plurality of potential buffer times associated with an execution time range;

select from the predetermined plurality of potential buffer times a buffer time from a plurality of different buffer times based on the baseline execution duration being within the execution time range associated with the selected buffer time; and generate an alert in response to the current execution duration being greater than a sum of the baseline execution duration plus the buffer duration.

9. The system of claim 8 wherein the determining of the current execution duration comprises reading, from the second computer-readable record, a start time corresponding to the batch process executing on the second data set.

10. The system of claim 8 further comprising an alert service configured to transmit the generated alert to one or more channels of a subscriber-based messaging system.

11. The system of claim 8, further comprising:
   a storage memory, wherein the monitoring device is further configured to store the generated alert in the storage; and
   an alert service configured to read the alert from the storage and transmit the alert to a subscriber.

12. A non-transitory computer-readable storage medium storing instructions that, when executed by a processor, cause the processor to perform the steps of:
   determining, by one or more processors, a baseline execution duration corresponding to a batch process comprising a computation executed on a first data set, wherein the baseline execution duration comprises a time duration based on an execution duration of the computation of the batch process executed on the first data set;
   executing, by the one or more processors, the computation of the batch process on a second data set after executing the batch process on the first data set;
   determining, by the one or more processors, a current execution duration corresponding to the computation of the batch process on the second data set;
   predetermining, by the one or more processors, a plurality of potential buffer times, each of the plurality of potential buffer times associated with an execution time range;
   selecting, by the one or more processors, from the predetermined plurality of potential buffer times a buffer time based on the baseline execution duration being within the execution time range associated with the selected buffer time; and
   generating, by the one or more processors, an alert in response to the current execution duration being greater than a sum of the baseline execution duration plus the buffer time.

13. The non-transitory computer-readable storage medium of claim 12, wherein the instructions cause the processor to further perform the steps of:
   executing, by the one or more processors, the batch process on the first data set; and
   creating a first computer-readable record, comprising data related to an execution duration of the computation, in response to executing the batch process on the first data set, and wherein the determining of the baseline execution duration comprises reading, by the one or more processors, the first computer-readable record.

14. The non-transitory computer-readable storage medium of claim 12, wherein the determining of the baseline execution duration comprises determining an aggregate of execution durations of multiple executions of the batch process, including the execution of the batch process on the first data set.

15. The non-transitory computer-readable storage medium of claim 12, wherein the determining of the current execution duration comprises reading a second computer-readable record comprising data related to execution duration of the computation corresponding to the batch executing on the second data set.

16. The non-transitory computer-readable storage medium of claim 15, wherein the current execution duration is determined based on a start time corresponding to the batch process executing on the second data set.

* * * * *